March 26, 1968  C. A. REYNOLDS  3,374,862
BEARING BALL GREASING MACHINE
Filed June 3, 1965  4 Sheets-Sheet 1

Fig. 1.

INVENTOR.
Curtiss A. Reynolds,
BY
Parker & Carter
ATTORNEYS.

March 26, 1968

C. A. REYNOLDS 3,374,862

BEARING BALL GREASING MACHINE

Filed June 3, 1965

INVENTOR.
Curtiss A. Reynolds,
BY
Parker & Carter
ATTORNEYS.

March 26, 1968  C. A. REYNOLDS  3,374,862
BEARING BALL GREASING MACHINE
Filed June 3, 1965  4 Sheets-Sheet 3
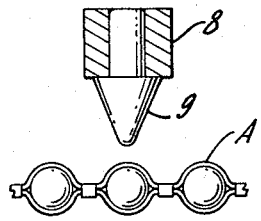
Fig. 6A.
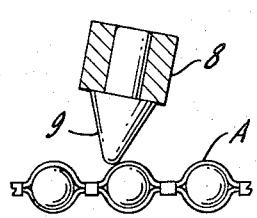
Fig. 6B.
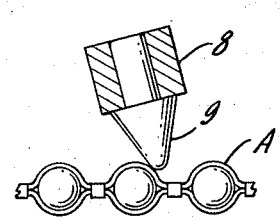
Fig. 6C.
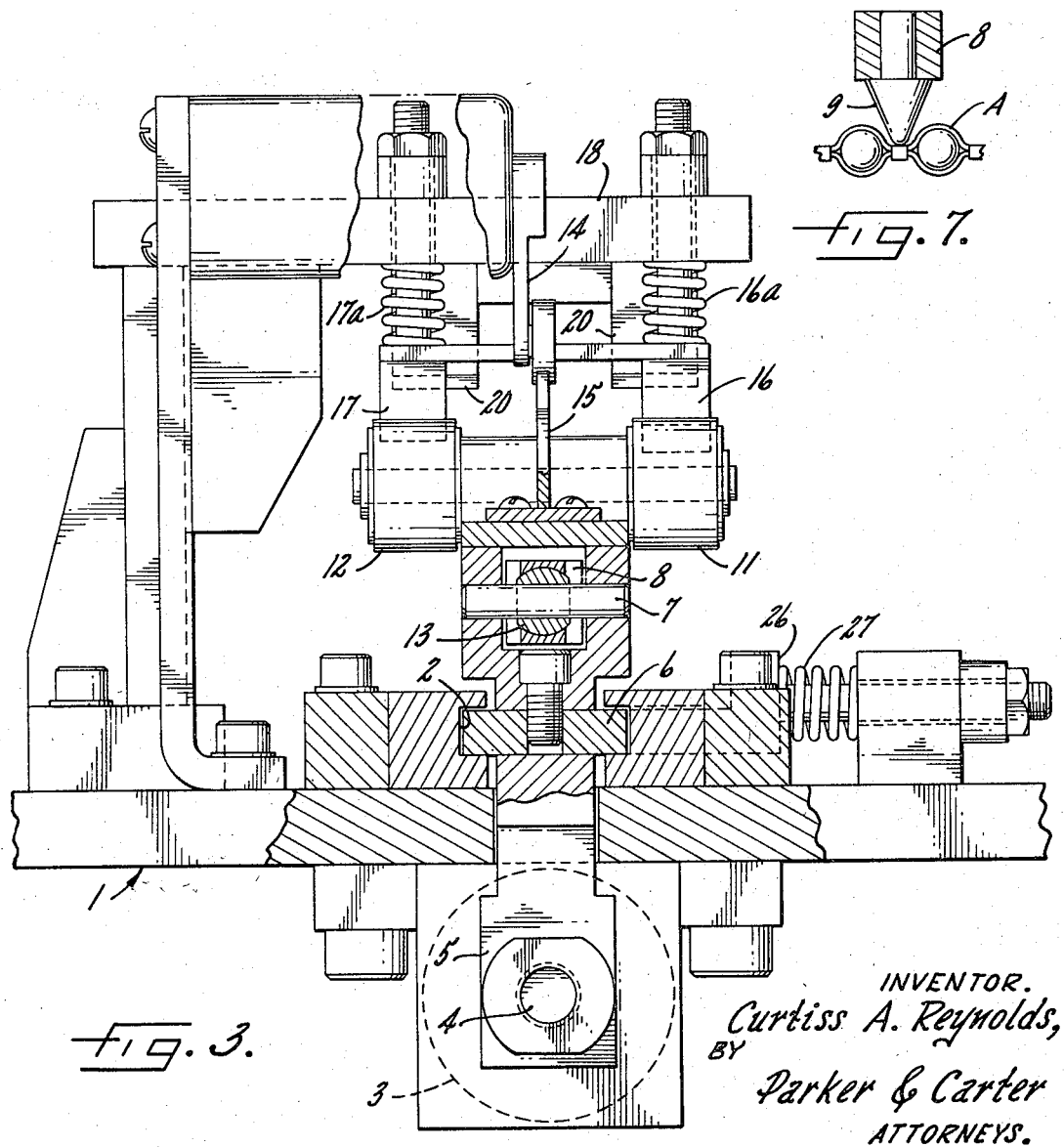
Fig. 7.
Fig. 3.
INVENTOR.
Curtiss A. Reynolds,
BY
Parker & Carter
ATTORNEYS.

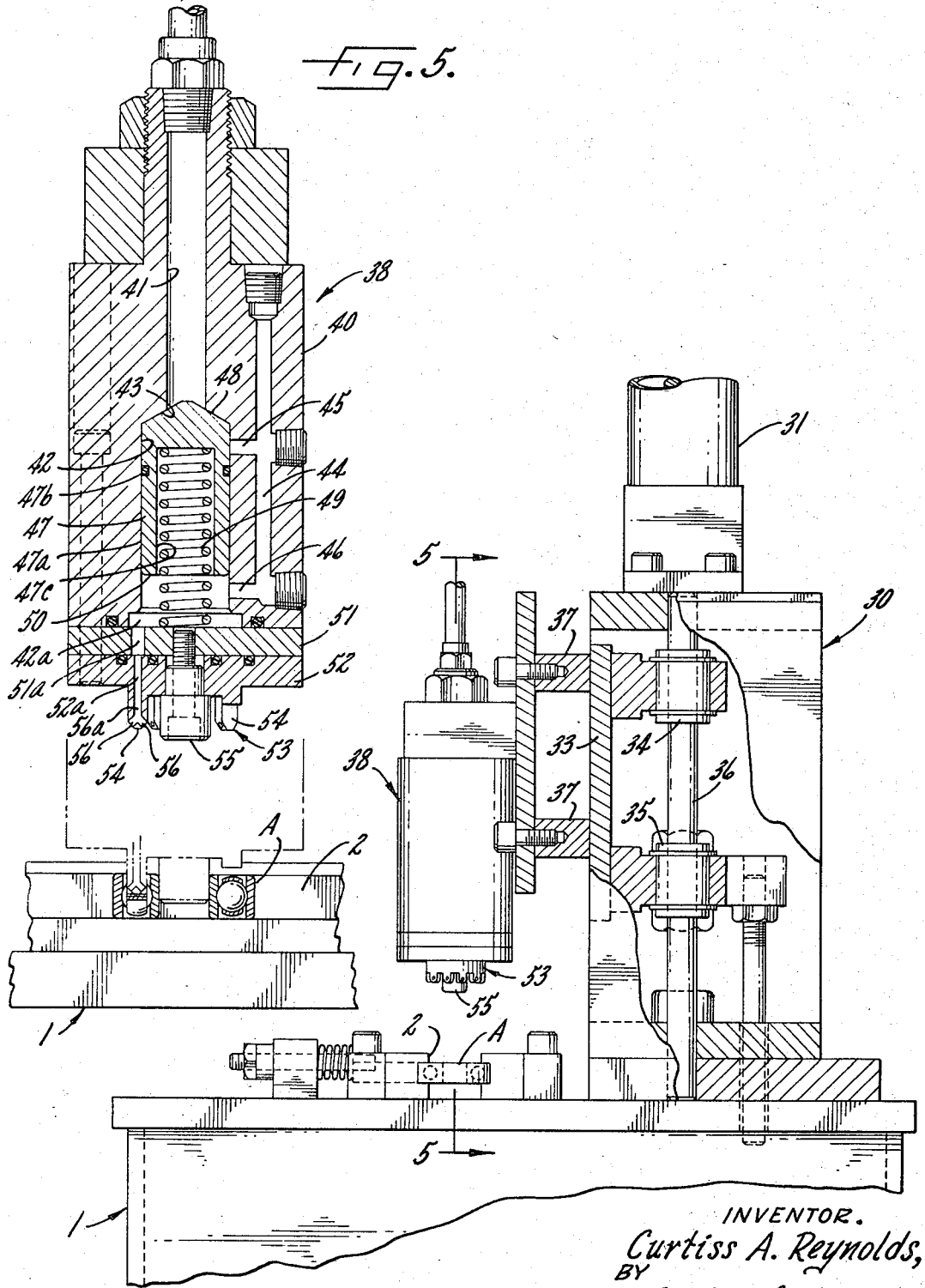

United States Patent Office 3,374,862
Patented Mar. 26, 1968

3,374,862
BEARING BALL GREASING MACHINE
Curtiss A. Reynolds, Rockford, Ill., assignor to Rehnberg-Jacobson Mfg. Co., Inc., Rockford, Ill., a corporation of Illinois
Filed June 3, 1965, Ser. No. 461,003
7 Claims. (Cl. 184—1)

ABSTRACT OF THE DISCLOSURE

A greasing assembly for bearinigs having movable retainers, including a track, a finger movable into a bearing and tiltable to move the retainer, and a grease nozzle alignable with the positioned retainer valleys to deposit grease radially of the bearing and means for maintaining a clean nozzle.

---

Figure 2:
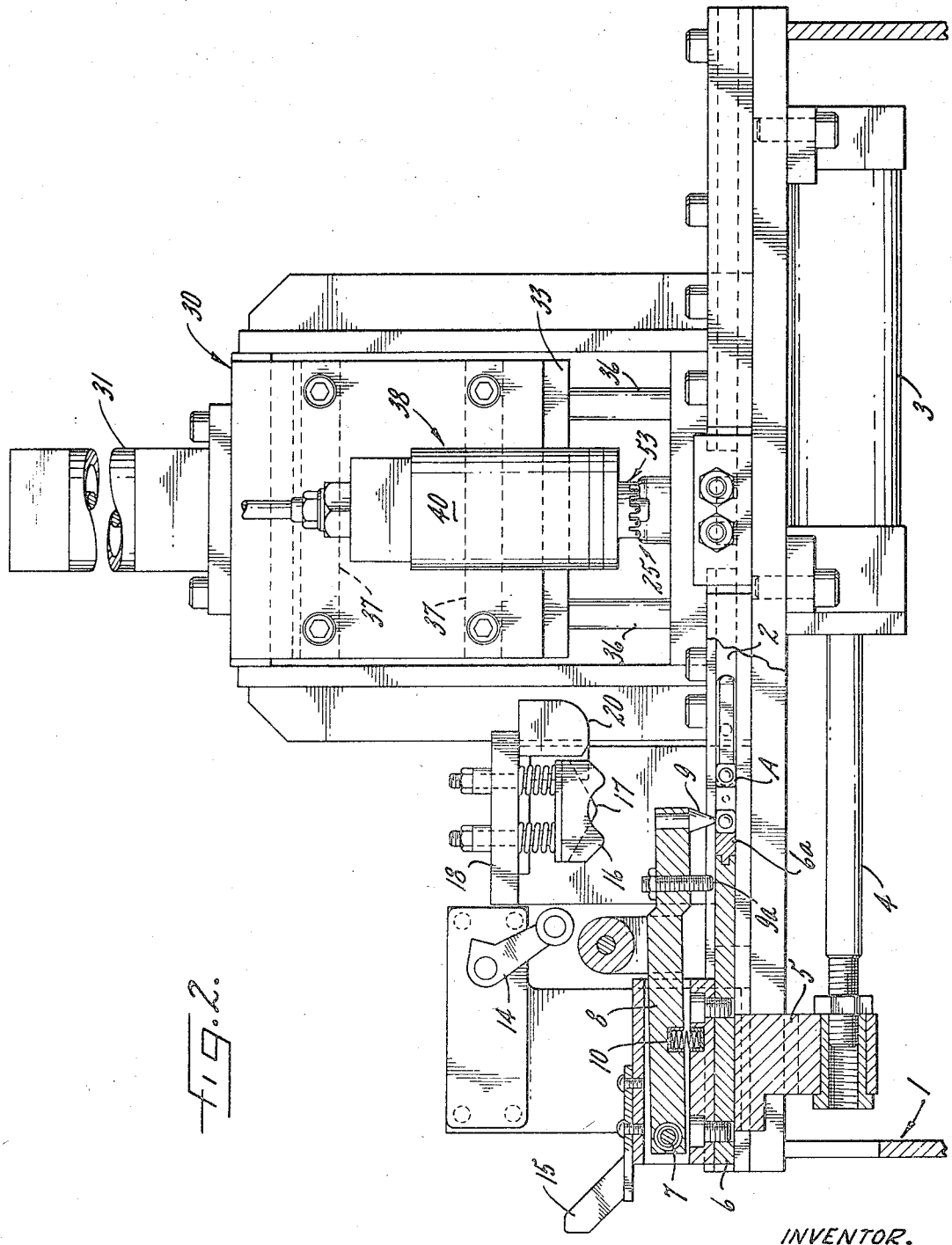

This invention relates to the field of ball bearing manufacture and has particular relation to an assembly effective in lubricating or greasing ball bearings.

One purpose of the invention is to provide a greasing assembly effective to supply grease in predetermined amounts and locations to a finished ball bearing.

Another purpose is to provide a ball bearing greasing assembly including means for positioning ball bearing elements prior to greasing the same.

Another purpose is to provide a ball bearing greasing assembly including means effective to provide the desired amount of grease to a ball bearing.

Another purpose is to provide a ball bearing greasing assembly including means for insuring against the waste of grease.

Another purpose is to provide a ball bearing greasing assembly including a greasing element effective to measure and dispense a predetermined quantity of grease.

Another purpose is to provide a greasing assembly including means for insuring against a delivery of grease to undesired locations.

Another purpose is to provide a ball bearing greasing assembly including means for insuring against injury to ball bearing elements.

Another purpose is to provide a ball bearing greasing assembly automatically effective to position bearing elements and thereafter to deliver predetermined quantities of grease to predetermined locations among said elements.

Other purposes will appear from time to time during the course of the specification and claims.

The invention is illustrated more or less diagrammatically in the acompanying drawings wherein:

FIGURE is an over-all top plan view;
FIGURE 2 is a side elevation;
FIGURE 3 is an end view in partial cross section and with parts broken away;
FIGURE 4 is an opposite end view in partial cross section and with parts broken away;
FIGURE 5 is a detail view in partial cross section illustrating a greasing element of the invention;
FIGURES 6A, 6B and 6C are detail views illustrating steps in the operation of an element of the invention; and
FIGURE 7 is a detail view illustrating another step in the operation of an element of the invention.

Like parts are indicated by like numerals throughout the specification and drawings.

Referring now to the drawings, the numeral 1 generally indicates a suitable support. A bearing track 2 is supported on the support 1. A first power mechanism, such as the pneumatic cylinder 3, is carried by the support 1 and a piston rod 4 extends therefrom. Piston rod 4 has its distal end secured to a depending arm 5 of a slide 6. It will be observed that the slide 6 is positioned for reciprocal movement along and above a portion of the track 2 in response to actuation of power means 3.

Pivoted as at 7 on slide 6 is a finger arm 8. The arm 8 carries at its end opposite the pivot 7 a depending positioner finger 9. Yielding means 10 urges arm 8 and finger 9 upwardly away from track 2. A pair of spaced cam followers or rollers 11, 12 are carried by and above arm 8. As will be best seen at 13 in FIGURE 3, arm 8 is carried rotatably about its axis on slide assembly 6.

A switch arm 14 is positioned above slide 6 for contact by an actuating abutment 15 carried by slide 6 as slide 6 reaches the terminus of its movement in one direction above track 2.

A set of offset cams 16, 17 depend from support bracket 18 and are urged yieldingly downwardly therefrom by associated springs 16, 17a, the cams 16, 17 being positioned for engagement by cam-following rollers 11, 12, respectively. A guide 20 is also carried beneath bracket 18 for guidance of rollers 11, 12 beyond cams 16, 17.

Intermediate the ends of track 2 a greasing station, indicated generally by the numeral 25, is located. A bearing retainer plate 26 is yieldingly urged toward track 2 at station 25 by suitable springs 27.

A superstructure 30 rises above and on support 1. A power means, such as the pneumatic cylinder 31, is carried by superstructure 30 and has a piston rod (not shown) extending therefrom and reciprocally operable thereby and having its outer end portion secured to a supporting bracket 33 which is in turn reciprocable, through ball bushings 34, 35 on guide rails such as that shown at 36. Bracket 33 carries, through suitable connector means 37, a grease dispenser assembly 38 for reciprocal motion vertically above track 2.

The grease dispenser assembly of the invention includes a housing 40. A grease inlet passage 41 extends downwardly axially in the housing 40 for communication with a chamber 42 having a frusto-conical roof portion 43. A by-pass passage 44 is formed in housing 40 alongside chamber 42 and communicates with the upper portion of chamber 42 below roof 43 as indicated at 45 and with the lower portion of chamber 42 as indicated at 46. Chamber 42 has an expanded lower end portion 42a below the communication 46 with passage 44. Reciprocal within chamber 42 is a plunger 47 having a frusto-concial roof 48 for mating with the roof 43 of chamber 42. Plunger 47 has a cylindrical wall 47a slidable along the inner surface of chamber 42 and carrying seal 47b in engagement therewith. Plunger 47 has a central, downwardly open well 47c in which spring 49 is positioned to urge plunger 47 upwardly or toward roof 43 within chamber 42. It will be observed that plunger 47 has a lower annular edge or end surface 50 which is positioned well above communication 46 when plunger 47 is in its uppermost position. Closure plates 51, 52 are secured to housing 40. Plate 52 carries the downwardly depending nozzle portion 53 which includes a plurality of circumferentially spaced nozzles 54 and a central or centering knob 55. It will be observed that each of the nozzles 54 has oppositely directed, downwardly inclined nozzle passage outlets 56 arranged for outward and inward delivery of grease radially of the nozzle member 53. Aligned passages 51a, 52a in plates 51, 52, respectively, communicate nozzle passage 56a and nozzle outlets 56 with the lower chamber area 42a of chamber 42.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention.

The use and operation of the invention are as follows:

A bearing A is placed in track 2 beneath the cam structure 16, 17 and beneath the finger 9 when slide 6 is at its rearmost position, as shown in FIGURE 2. The bearing to be greased, when so positioned, actuates switch 60 through arm 61 and yieldingly-urged pin 62 and power means 3 is actuated to draw arm 5 along and beneath track 2 to the right as the parts are shown in the drawings, and thus to draw slide 6 and locating arm 8 with its finger 9 to the right along and above track 2. At the same time, of course, the forward edge of slide portion 6a, which rides within track 2, moves the bearing A along track 2. As such movement continues the cam-following rollers 11, 12 are brought into position for contact with cams 16, 17. The contact of rollers 11, 12 with cams 16, 17 urges finger 9 downwardly toward and into the area between the inner and outer races of the bearing A. As may be best seen in FIGURES 6A, 6B and 6C, for example, the action of cams 16, 17 upon rollers 11, 12 is shown as to tilt the finger 9 about its horizontal axis as its forward and downward motion continues under the influence of power means 3 and cams 16, 17. The finger 9 is thus tilted to one side, as shown in FIGURE 6B, to the other side as in FIGURE 6C, and thereafter returned to its original vertical position, such as that shown in FIGURE 7, wherein finger 9 is shown at its lowermost position. Thus the finger 9, should it descend toward the generally central portion of the upper bearing retainer, as indicated in FIGURE 6A, will be caused to tilt and continue downwardly to cause the conical surface of finger 9 to contact one side of said bearing retainer raised portion and, as the finger is tilted through its vertical position, as shown in FIGURES 6B, 6C, it will have moved the said raised retainer position to one side, i.e. it will have moved the retainer assembly and balls with the inner and outer bearing races. When finger 9 returns to vertical position it will be between raised retainer portions as shown in FIGURE 7. Should the finger 9 originally come down between the inner and outer races of bearing A and between two of the balls therein, as shown in FIGURE 7, for example, it will be understood that the tilting action thus described will be repeated but will result merely in an initial movement of the retainer and bearing assembly between said inner and outer races first in one direction and then in another to return it to its original position and the parts will be positioned as shown in FIGURE 7. Abutment 9a limits the downward travel of finger 9.

Thus it will be realized that whether the finger 9 descends upon the bearing ball retainer within a completed bearing A at a point such as to bring finger 9 into contact with a raised portion of said retainer, or such as to bring it within the lowered or valley portions of said retainer, the retainer will be moved, in either event, as a result of the tilting action of finger 9, to a position in which finger 9 rests in a valley between each of the hill portions of the retainer and thus between two adjacent walls of the bearing assembly.

Thus the finger 9, it will be understood, descends in a vertical plane, is tilted to one side, then through the vertical to an opposite tilt as it continues to descend and is then re-erected into vertical position at the lowermost extent of its downward travel. Since the performance of the completed bearing will, as is known, be influenced by the extent to which the retainer and balls are accurately positioned and balanced, avoidance of all injury to the delicate and precise relationship of the races, balls and retainer rings of the bearing is important.

As said centering or locating action of the bearing and retainers within the bearing assembly A is completed, the bearing assembly A will have been moved into greasing station 25. Abutment 15 will contact switch arm 14 and through appropriate circuitry or similar controls (not shown) rod 4 will be moved outwardly of cylinder 3 and the positioner arm 8 and finger 9 will be withdrawn toward the position shown in FIGURE 2. It will be realized that as the cam rollers 11, 12 left cams 16, 17, the same were guided upwardly by cam 20 in response to yielding means 10 and that bearing assembly A reached station 25 under the influence of slide portion 6a, the retainer remaining in the position into which it was placed by finger 9. Thus, through the simultaneous, timed, automatic lowering, tilting and retilting of finger 9, the finger 9 and the retainer are immunized from damaging contact which could occur from engagement of the tip of finger 9 with a top of the rises in the retainer. Similarly, such engagement can lock the retainer against movement and the retainer would not be positioned to receive nozzles 54 in the retainer valleys.

With slide 6 withdrawn, power means 31 is automatically actuated by suitable circuitry or controls (not shown) to cause downward movement of greasing assembly 38. When greasing assembly 38 reaches track 2, the centering nose 55 enters the central area within the inner race of the bearing assembly A and nozzles 54 will descend into the area between the inner and outer races of bearing assembly A. Since nozzle openings 56 are spaced from the outer ends of nozzles 54, contact of said ends with the ball retainer will not blind said openings. Since one of the nozzles 54 is aligned with the finger 9, it will be realized that each of the nozzles 54 thus descends into a valley area between adjacent rises in or balls within the upper retainer within the assembly A. With the nozzles thus positioned and nozzle outlets 56 being thus positioned to direct grease inwardly and outwardly in radial paths to the area of the inner and outer races between adjacent balls therein, a suitable metering valve (not shown) is actuated to force a predetermined quantity of grease under pressure into passage 41.

As said quantity of grease is forced into passage 41, the plunger 47 is caused to move downwardly against the action of spring 49. Said downward action of plunger 47 is effective to force a predetermined, prepositioned quantity of grease from chamber 42a through passages 51a, 52a, 56a and outwardly of nozzle openings 56 into the bearing to lubricate the same.

With the action of the metering valve completed, said valve is shut off and no further grease under pressure is delivered to passage 41. Hence spring 49 is effective to return plunger 47 to its uppermost position against the roof 43 of chamber 42. As said plunger begins its upward movement it meets a quantity of the grease delivered thereabove by the metering valve to the upper portion of chamber 42. Said quantity of grease is moved through communication 45 and into passage or channel 44 by the upward motion of plunger 47. As said grease moves into passage 44 it urges or forces an equal quantity of grease outwardly through communication 46 into chamber portion 42a. At the same time, as plunger 47 moves upwardly, immediately following the expulsion of grease outwardly of nozzle openings 56, a lowered pressure area, in effect, is created within chamber 42a and excess grease within passages 56a, 52a, 51a is precluded from oozing or moving outwardly of outlets 56 as the nozzle member 53 is withdrawn from the bearing assembly A. As is well known, grease and similar lubricants have a tendency to "creep" or "walk" or move even after pressure previously applied thereto has been withdrawn therefrom. The lowered pressure chamber 42a created by upward movement of plunger 47 provides an area for acceptance of the quantity of grease delivered at communication 46 from passage 44 in response to upward movement of plunger 47 and to receive excess of expanding grease from passages 56a, 52a, 51a. Thus is created a type of suction action wherein a predetermined quantity of grease is delivered through the nozzle outlets 56 and, the moment the pressure action has succeeded in delivering the desired quantity of grease, a type of suction or pressure differential action is created to insure the cutting off of any further grease delivery from outlets 56, chamber 42a forming a ready and available reservoir area or space into which grease may expand or travel. Thus the waste and mess created by dripping or undesired discharge of excess grease from openings 56 is eliminated.

When, as indicated, the greasing action has been completed, power means 31 is actuated to move bracket 33 and greasing assembly 38 upwardly from bearing assembly A. Thereafter a subsequent bearing assembly, moved forward by slide 6, may be relied upon to contact and move the lubricated bearing from station 25 along track 2, or to the right as the parts are shown in the drawings. Alternatively, suitable slide or finger elements may be employed to move lubricated bearings out of station 25. In any event, the completed, lubricated bearings are removed from the right-hand portion of track 2 manually or by any suitable means.

The assembly of the invention thus enables the operator to suitably place a dry bearing in track 2 (at the left portion as the parts are shown in the drawings) and to remove the same bearing from a spaced portion of track 2 with an ensured, predetermined quantity of grease in each of numerous predetermined locations about the opposed surfaces of the inner and outer bearing races. The locating and greasing action is rapid, automatic and reliable. The retainer is accurately and rapidly positioned by finger 9 to receive grease nozzles 54 without injury to the retainer in either the positioning or greasing actions. The greasing assembly provides a predetermined quantity and positioning of grease and is free of messy, undesirable dripping or discharge.

There is claimed:

1. A greasing assembly for bearings having movable elements, including a bearing track, a positioner finger, means associated with said finger for reciprocating and tilting said finger above said track, whereby said finger is adapted to penetrate said bearing and rotate said movable elements, a greasing assembly mounted for reciprocation above said track, means for moving a bearing along said track, said greasing assembly including at least one grease-dispensing nozzle, said finger being adapted to position said movable elements for predetermined interpenetration with said nozzle.

2. In a bearing treating assembly, a support, a bearing track on said support, a slide reciprocable in said track, a finger member pivoted on said slide for vertical movement above and into said track, means for tilting said finger member about a horizontal axis, a greasing member reciprocable above said track, said member including a plurality of grease-dispensing nozzles, at least one of said nozzles lying in a vertical plane having the same lateral position in relation to said track as the vertical plane of said finger member, whereby said finger member positions a movable element in a bearing for penetration of said nozzle into said bearing to effect greasing of the bearing.

3. In a bearing treating assembly, a support, a bearing track on said support, a slide reciprocable in said track, a finger member pivoted on said slide for vertical movement above and into said track, a cam member positioned for engagement with said finger member, said finger member being mounted for tilting about a horizontal axis in response to movement of said slide and engagement of said cam and finger member, a greasing member reciprocable above said track and downstream of said finger member, said member including a plurality of grease-dispensing nozzles, at least one of said nozzles having the same position as said finger member laterally of said track, a housing having a chamber communicating with said nozzles, a plunger in said chamber, said plunger being movable in one direction in response to entry of grease into said chamber under pressure to force grease through said nozzles, whereby said finger member positions a movable element in a bearing for penetration of said nozzle into said bearing to effect greasing of the bearing.

4. In a bearing treating assembly, a support, a bearing track on said support, a slide reciprocable in said track, a finger member pivoted on said slide for vertical movement above and into said track, means for tilting said finger member about a horizontal axis, a greasing member reciprocable above said track, said member including a plurality of grease-dispensing nozzles, at least one of said nozzles lying in the vertical plane of said finger member, a housing having a chamber communicating with said nozzles, a plunger in and in sealing engagement with said chamber, said plunger being movable in one direction in response to entry to grease into said chamber under pressure to force grease through said nozzles, and yielding means engaging said plunger within said chamber and positioned to urge said plunger in the opposite direction, whereby said finger member positions a movable element in a bearing for penetration of said nozzle into said bearing to effect greasing of the bearing.

5. In combination, a support, a bearing track on said support and means for moving a bearing therein, a finger element, means for moving said finger element into and out of engagement with a bearing in said track and for simultaneously tilting said finger element to position a ball retainer in said bearing, a greasing element having a plurality of nozzles movable into and out of said bearing to supply grease thereto, said retainer being positionable by said finger element to align the valleys in said retainer with said nozzles.

6. In combination, a support, a bearing track on said support and slide means for moving a bearing therein, a finger element, means for moving said finger element into and out of engagement with a bearing in said track and for simultaneously tilting said finger element to position a ball retainer in said bearing, a greasing element having a plurality of nozzles movable into and out of said bearing to supply grease thereto, at least one of said nozzles being aligned with said finger element, whereby said finger element positions said ball retainer in said bearing such that said nozzles may penetrate into said bearing to effect greasing of the bearing.

7. In combination, for use in supplying grease to a bearing having a retainer, a support, at least one finger member mounted on said suport and engagebale with said retainer, means on said support for tilting said finger member to insure positioning of said member within a valley of said retainer and grease nozzle outlets on said support and positionable to deliver grease radially of the valleys of said retainer, whereby said finger member positions said retainer in said bearing such that said nozzle may penetrate into said bearing to effect greasing of the bearing.

References Cited

UNITED STATES PATENTS

| 1,880,854 | 10/1932 | Davis | 184—42 X |
| 3,072,146 | 1/1963 | Gizeski | 137—552 |

FOREIGN PATENTS 906,794  5/1945  France.

LAVERNE D. GEIGER, *Primary Examiner.*

E. EARLS, *Assistant Examiner.*